(12) United States Patent
Swier et al.

(10) Patent No.: US 11,267,202 B2
(45) Date of Patent: Mar. 8, 2022

(54) ADDING BUILD MATERIAL TO A BUILD MATERIAL CONTAINER

(71) Applicant: HEWLETT-PACKARD DEVELOPMENT COMPANY, L.P., Spring, TX (US)

(72) Inventors: Kevin E. Swier, Corvallis, OR (US); James R. Owen, Corvallis, OR (US); Brad Benson, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 2 days.

(21) Appl. No.: 16/605,608

(22) PCT Filed: Oct. 5, 2017

(86) PCT No.: PCT/US2017/055280
§ 371 (c)(1),
(2) Date: Oct. 16, 2019

(87) PCT Pub. No.: WO2019/070270
PCT Pub. Date: Apr. 11, 2019

(65) Prior Publication Data
US 2020/0130278 A1    Apr. 30, 2020

(51) Int. Cl.
*B29C 64/357*    (2017.01)
*B29C 64/314*    (2017.01)
(Continued)

(52) U.S. Cl.
CPC .......... *B29C 64/357* (2017.08); *B29C 64/241* (2017.08); *B29C 64/255* (2017.08);
(Continued)

(58) Field of Classification Search
None
See application file for complete search history.

(56) References Cited

U.S. PATENT DOCUMENTS 5,053,825 A    10/1991    Trainor et al.
6,922,540 B2    7/2005    Yoshikawa et al.
(Continued)

FOREIGN PATENT DOCUMENTS

| DE | 102005022954 B4 | 5/2008 |
| EP | 2177106 A1 | 4/2010 |
| EP | 3112136 B1 | 1/2017 |

OTHER PUBLICATIONS

Ambrosi, A. et al. 3D-printing Technologies for Electrochemical Applications, 2016, http://pubs.rsc.org/-/content/articlelanding/2016/cs/c5cs00714c#!divAbstract >.

*Primary Examiner* — Matthew J Daniels
*Assistant Examiner* — Paul Spiel
(74) *Attorney, Agent, or Firm* — HP Inc. Patent Department (57) ABSTRACT

According to one aspect, there is provided a method of adding build material to a rotatable 3D printing build material container having an internal build material storage reservoir, the method comprising: providing a supply of build material to an input port of the container; rotating the container about its rotation axis at a first speed sufficient to cause build material within the container to be centrifugally forced against the outside of the internal storage reservoir.

13 Claims, 8 Drawing Sheets

(51) Int. Cl.
- *B29C 64/329* (2017.01)
- *B29C 64/255* (2017.01)
- *B33Y 10/00* (2015.01)
- *B33Y 40/00* (2020.01)
- *B29C 64/259* (2017.01)
- *B29C 64/241* (2017.01)
- *B33Y 30/00* (2015.01)

(52) U.S. Cl.
CPC .......... *B29C 64/314* (2017.08); *B29C 64/329* (2017.08); *B33Y 10/00* (2014.12); *B33Y 30/00* (2014.12); *B33Y 40/00* (2014.12)

(56) References Cited

U.S. PATENT DOCUMENTS

| | | |
|---|---|---|
| 7,130,566 B2 | 10/2006 | Nagahama et al. |
| 7,606,519 B2 | 10/2009 | Mihara |
| 7,738,816 B2 | 6/2010 | Sakita et al. |
| 2010/0080580 A1 | 4/2010 | Yamaguchi et al. |
| 2017/0232519 A1* | 8/2017 | Pan .................. B22F 10/00 425/3 |

\* cited by examiner

ADDING BUILD MATERIAL TO A BUILD MATERIAL CONTAINER

BACKGROUND

Additive manufacturing, commonly referred to as three-dimensional or 3D printing, enables objects to be generated on a layer-by-layer basis, for example through the selective solidification of a build material.

Powder-based 3D printing systems, for example, typically form successive thin layers of a powder or particulate-type build material on a build platform within a build chamber and selectively solidify portions of each layer that represent a cross-section of a 3D object. The powdered build material may be stored in build material containers that may interface directly with an element of a 3D printing system.

BRIEF DESCRIPTION

Examples will now be described, by way of non-limiting example only, with reference to the accompanying drawings, in which.

DETAILED DESCRIPTION

Figure 1:
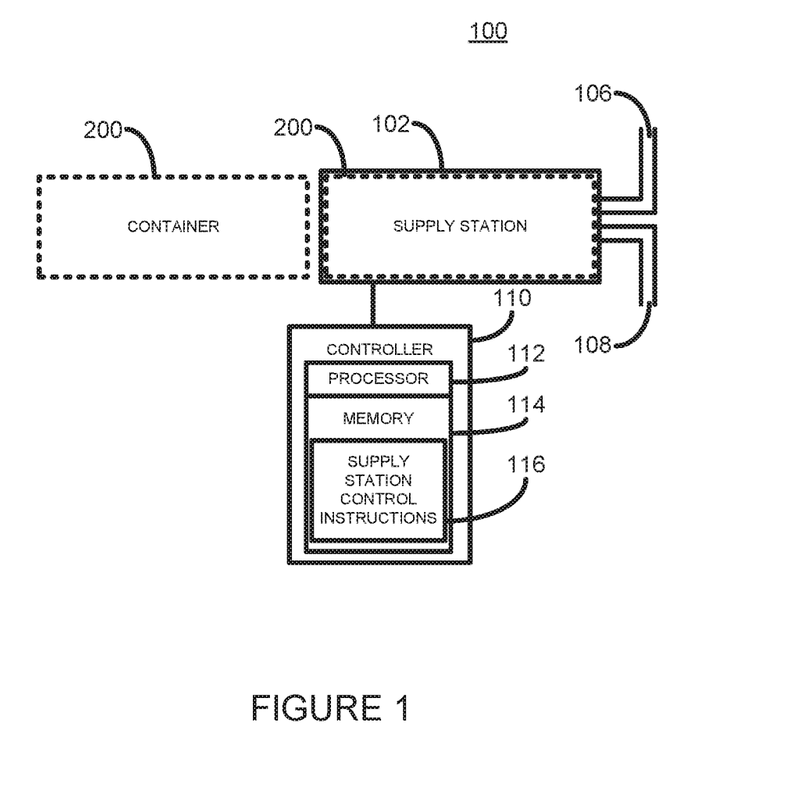
FIG. 1 is a schematic diagram of an apparatus according to one example.

Referring now to FIG. 1, there is shown a block diagram of an apparatus 100 according to one example. In one example, the apparatus 100 is part of a 3D printing system. In another example the apparatus 100 is a part of a build material management station for use with a 3D printer. In a further example, the apparatus 100 is part of a container filling system.

The apparatus 100 comprises a supply station 102 into which a rotatable build material container 200, shown in dotted lines, may be removably inserted. In one example the build material is a particulate plastic powder, or powder-like, material, such as those used generally in 3D printing systems. Examples of suitable build material may include PA11, PA12, and other thermoplastics. In other examples other types of build material may be used, including: metal powder build material; and ceramic powder build material.

The supply station 102 may rotate the container 200 about the container's central axis to either remove build material stored in the container or to add build material to the container depending on the direction of rotation, as described in greater detail below. In one example, the supply station may directly rotate the container 200, for example by having the container 200 seated on wheels and/or bearings, and providing a motorized drive mechanism to impart rotational motion to the container 200. In another example, the supply station 102 may comprise a rotatable cage or interface into which the container 200 may be inserted. In this example the cage may be rotated by a motorized drive mechanism.

The supply station 102 further comprises a build material input port 106, through which build material may be supplied to be added to the container 200. In one example, the supply station 102 additionally comprises a build material output port 108 through which build material in the container 200 may be removed.

Build material may be supplied to the input 106 and may be removed from the exit 108 using any suitable build material transport system, such as a gravity feed system, a pneumatic conveyancing system, a mechanical feed screw system, or the like.

In one example the supply station 102 is designed to receive the container 200 in a substantially horizontal orientation. By substantially horizontal is meant the container rotation axis being at an angle of no more than about +/−10 degrees from horizontal. In another example, however, the supply station 102 may be designed to receive the container 200 at a higher angle from horizontal.

Operation of the apparatus 100 is controlled by a controller 110. The controller 110 comprises a processor 112, such as a microprocessor or microcontroller, coupled to a memory 114, for example via a suitable communications bus. The memory 114 stores processor understandable instructions 116 that, when executed by the processor 112, cause the processor 112 to control elements of the apparatus 100 as described herein.

Figure 2A:
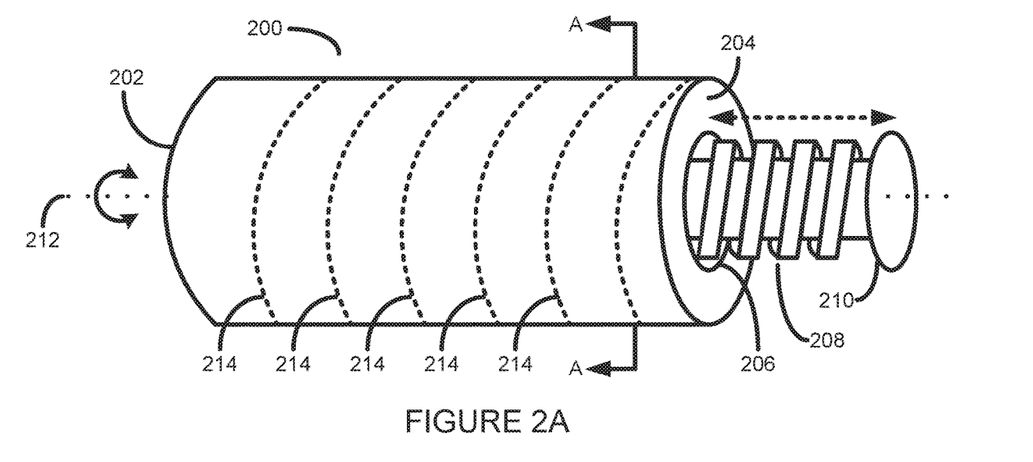
FIGS. 2A and 2B are illustrations of a build material container according to one example.
Figure 2B:
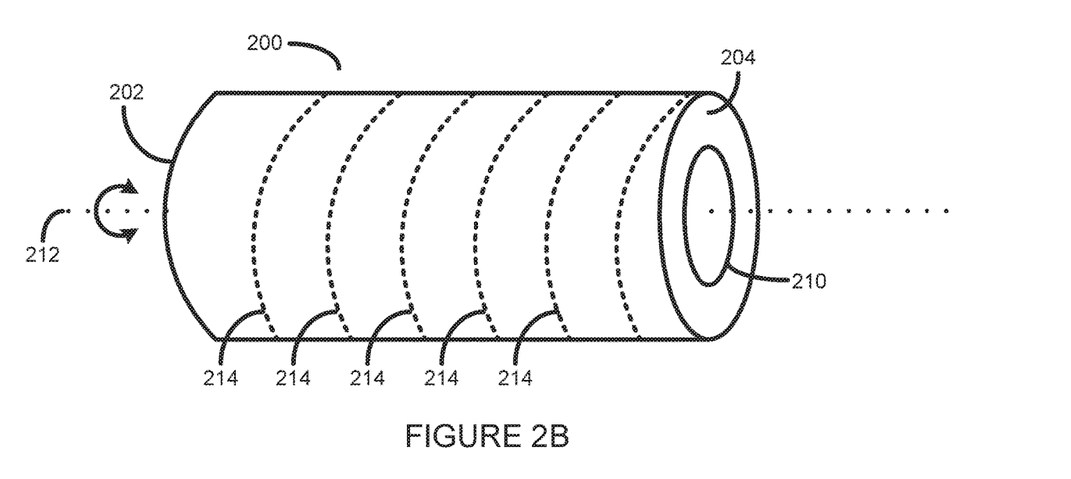

Referring now to FIG. 2 there is shown an illustration of an example build material container 200 suitable for installation and use in the supply station 102. The container 200 has a generally hollow cylindrical shape and comprises a closed end 202 and openable end 204 opposite the closed end 202. In other examples, however, the container 200 may have any other suitable shape. The container 200 provides an internal space, or reservoir, for storing build material, such as powdered build material suitable for use with a three-dimensional (3D) printing system. The openable end 204 comprises a circular aperture 206 in which is located an extendible and retractable build material transport mechanism 208. In the example shown the build material transport mechanism 208 comprises a screw mechanism. In one example the container has a length of about 60 cm, a height of about 20 cm, and a build material storage capacity of about 15 liters (15000 $cm^3$). In other examples, however, containers with different dimensions and different storage capacities may be provided.

At the external extremity of the build material transport mechanism 208 is provided an end seal member 210. When the build material transport mechanism 208 is in the retracted position, as shown in FIG. 2B, the entirety of the build material transport mechanism is positioned within the outer housing of the container 200, wherein the end seal member 210 forms a substantial seal with the end 204 of the container 200. The end seal member 210 may fit flush to, or slightly protruding from, the end 204 of the container. The end seal member 210 may additionally comprise a protrusion, or other feature, (not shown) to all extension and retraction of the build material transport mechanism 208. The seal provided by the seal member 210 is sufficient to prevent build material in the container 200 from unintentionally leaking out of the container when the build material transport mechanism 208 is in the retracted position. In one example a screw cap (not shown) may be fitted over the seal member 210 to securely hold the build material transport mechanism 208 in place in a sealed position, for example during transport of the container 200.

When in the extended position, as shown in FIG. 2A, the build material transport mechanism 208 is positioned such that a first portion of the build material transport mechanism 208 is located external to the outer housing of the container 200 and such that a second portion of the build material transport mechanism 208 is located internal to the outer housing of the container 200. The build material transport mechanism 208 and aperture 206 are axially aligned to a central rotation axis 212 of the container 200.

In one example the container 200 additionally comprises an internal transport system 214, shown in dotted lines, which may or may not be visible from the outside of the container depending on the container construction method. The transport system 214 may comprise, for example, one or multiple elements that form, for example, a continuous or a discontinuous screw thread, angled blades, or the like.

Where the build material transport mechanism 208 and the internal transport system 214 comprise screw mechanisms they both have the same handedness. The characteristics of the build material transport mechanism 208 and the internal transport system 214 affect the quantity of build material that is displaced for each revolution of the container. Such characteristics may include one or more of: the screw pitch; the root or minor diameter; the crest height or major diameter; the number of helices; and the thread angle.

As will be described in greater detail below, when the build material transport mechanism 208 is in its extended position, the container 200 may be rotated in a first direction about its central axis 212 to cause powdered build material stored in the container 200 to be removed from the container. Build material may thus be moved firstly by the internal transport system 214 towards the aperture 206, and secondly by the build material transport mechanism 208. In one example the container 200 may additionally comprise an internal scoop member (not shown), positioned towards the aperture 206, that acts to lift up an amount of build material within the container 200 and to deposit the amount of build material on the build material transport mechanism 208 as the container 200 is rotated in the first direction.

The container 200 may also be rotated in a second direction opposite the first direction to allow powdered build material to be added to the container 200. As the container 200 is rotated, build material supplied, for example, to at least a portion of the build material transport mechanism 208 is firstly transported towards the aperture 206 and then into the container 200, and is secondly transported generally towards the closed end 202 of the container 200 by the transport system 214. Due to the flowability of the build material, however, the effectiveness of the internal transport mechanism 214 may depend on the level of build material within the container. For example, the internal transport mechanism 214 may be most effective when the level of build material is close to or is below the height of features, such as a screw thread, of the internal transport mechanism.

Figure 3:
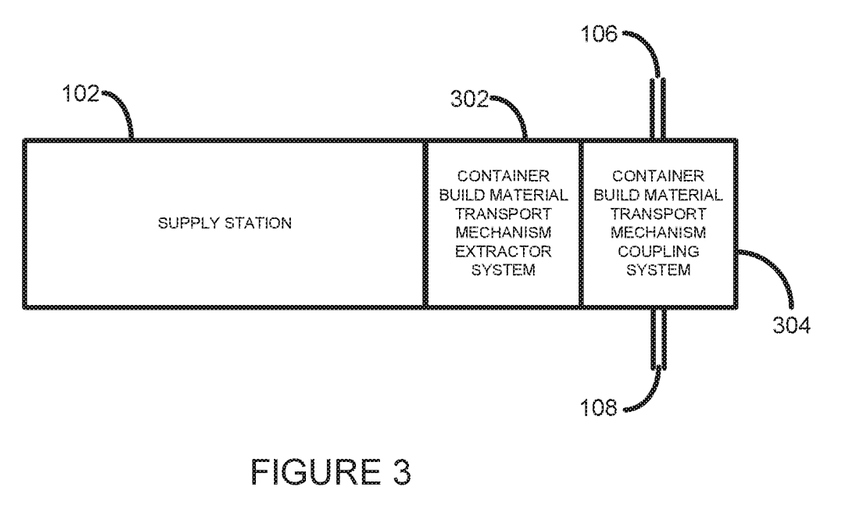
FIG. 3 is a schematic diagram of an apparatus according to one example.

FIG. 3 shows a schematic diagram of an example supply station, such as the supply station 102, in more detail. As illustrated, the supply station 102 additionally comprises a container build material transport mechanism extractor system 302 and a container build material transport mechanism coupling system 304, according to one example.

The container build material transport mechanism extractor system 302 provides a mechanism for extending and retracting the build material transport mechanism 208 of a container. In one example, the extractor system 302 comprises a movable mechanical arm to detachably connect to an extraction feature on the end seal member 210 such that movement of the mechanical arm may either retract or extend the build material transport mechanism 208. In one example, the extractor system 302 may be motorized and be controlled by the controller 110.

The container build material transport mechanism coupling system 304 provides a coupling member that is moveable over an extended build material transport mechanism 208 and is sealable against the container 200 to provide a build material input 106 and output 108. In one example, the coupling system 304 provides only a build material input 106.

Figure 4:
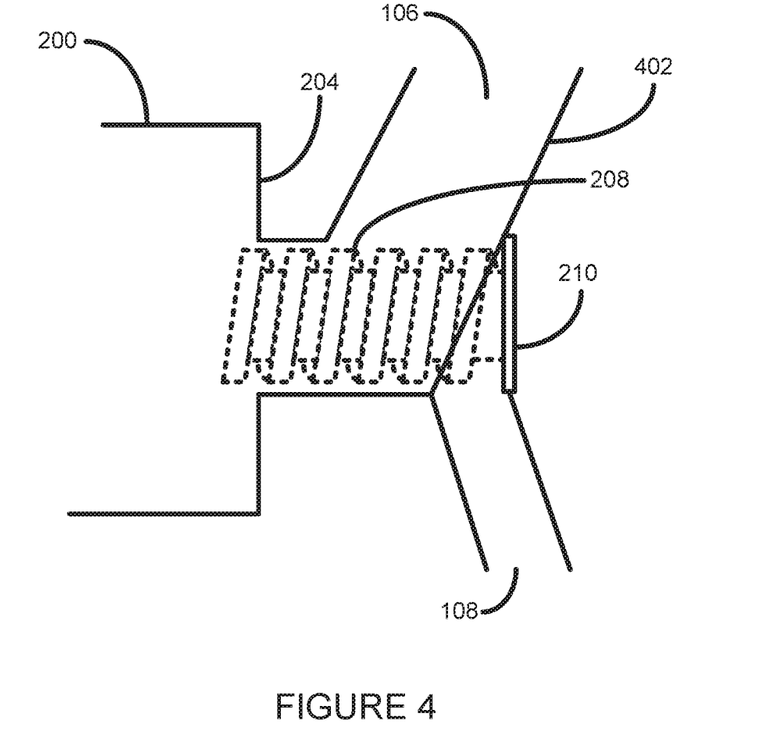
FIG. 4 is an illustration of a coupling system according to one example.

The coupling system is shown in more detail at 402 in the schematic cross-section shown in FIG. 4. The coupling member 402 provides a build material input 106 and a build material output 108. The coupling member 402 may be coupled to the container build material transport mechanism 208 when in its extended position, as illustrated in FIG. 4. In one example, the coupling member 402 may comprise only a build material input 106, for example for use in the large scale filling operations of build material containers of the type described herein.

In the example shown, the coupling member 402 comprises a first portion providing a build material input 106 that, when the coupling member 402 is coupled to the build material container 200, is adjacent to the container end wall 204 and forms a seal therewith. The build material input 106 forms a channel, in fluid communication with a portion of the build material transport mechanism 208, into which build material may be provided and which serves to feed, for example under gravity, build material to the build material transport mechanism 208. This allows build material input through the build material input 106 to, when the container is rotated in an appropriate direction, be moved from the build material input 106 inside the container 200 by the build material transport mechanism 208.

The coupling member 402 may additionally comprise a second portion providing a build material output 108 adjacent but mainly separated from the first portion that, when the coupling member 402 is coupled to the build material container 200, is distant from the container end wall 204. The build material output 108 forms a channel generally situated below, and in fluid communication with, the build material transport mechanism 208. This allows, when the container 200 is rotated in an appropriate direction, build material to be moved from the container and into the build material output 108 by the build material transport mechanism 208.

In one example the coupling system 304 comprises a movable coupling member 402 that may be moved over an extended container build material transport mechanism 208 to provide a substantial seal against the openable end 204 of the container 200. In one example the coupling member 402 provides a rotatable sealing feature (not shown) in which the substantial seal provided against the openable end 204 of the container 200 is maintained as the container 200 is rotated. In one example the coupling member 402 may be motorized and controlled by the controller 110 to couple and decouple with a container 200 when such a container is installed into or is removed from the supply station 102.

Figure 5A:
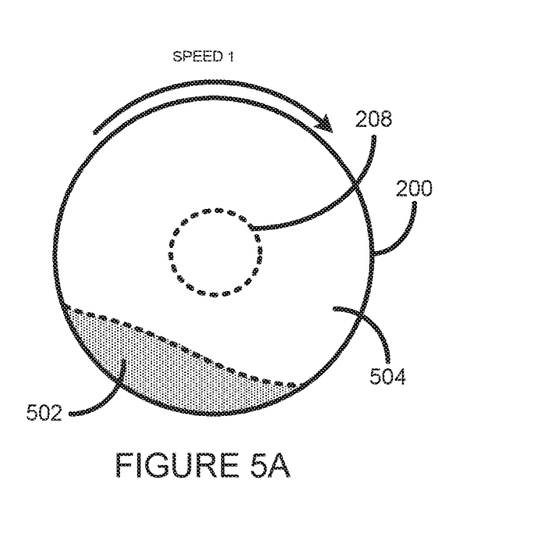
FIGS. 5A and 5B are illustrations of build material within a container according to one example.
Figure 5B:
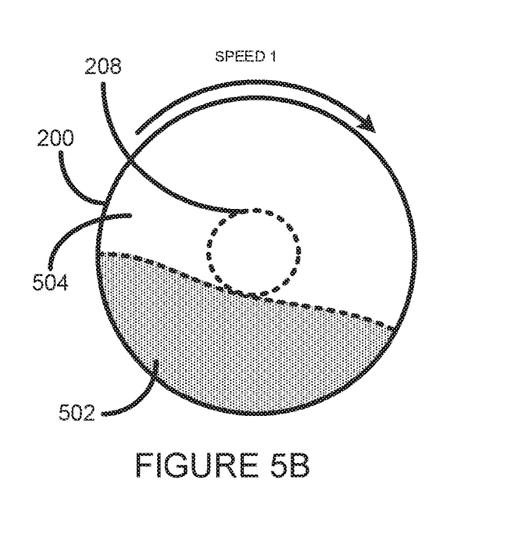

As described, build material may be added to the build material container 200 by installing the container 200 into the supply station Referring now to FIGS. 5A to 5B there are shown a number of illustrations outlining the process of adding build material to container. Each drawing shows representative illustration of a cross-section A-A (as shown in FIG. 2A) of the container 200.

As shown in FIG. 5A, the container 200 contains a small amount of build material 502, with the remainder of the container reservoir 504 comprising air. As the container 200 is rotated in a continuous manner about its central axis in a clockwise direction at a first speed, the build material 502 is generally fluidized and flows within the reservoir as illustrated. In a general manner, build material on the rising side of the reservoir, as the reservoir is rotated, is raised due to friction with the walls of the reservoir. Depending on the speed of rotation of the container 200 build material 502 may experience slipping, slumping, rolling, cascading, or cataracting. As build material 506 is added to the container 200, via the build material transport mechanism 208, the level of the build material rises, as illustrated in FIG. 5B. The first speed in this example may be in the order of about 60 revolutions per minute, although this may be dependent on characteristics of the build material 502, such as its flowability or density.

Since the container build material transport member 208 is axially located within the container 200, the level to which the container reservoir may be filled is limited to about half full. This is because as the level of build material reaches the level of the build material transport member 208 any build material present on the build material transport member 208 is choked-flowed by build material in the container 200. By choked-flowed is meant that the build material present in the build material container prevents the further flow, and thus the further ingress, of build material into the container.

Figure 6:
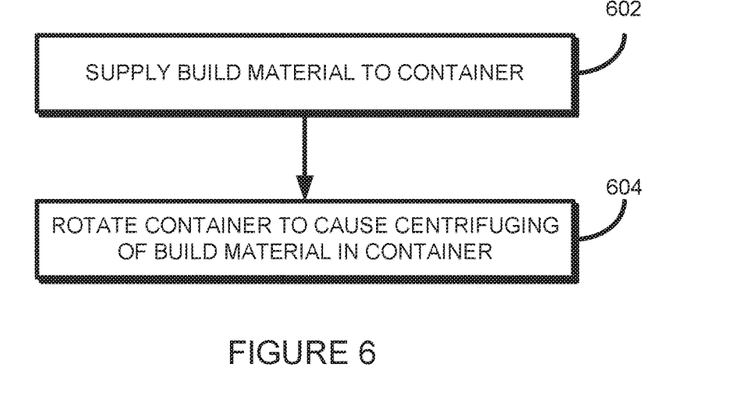
FIG. 6 is a flow diagram outlining a method of adding build material to a container according to one example.

With reference to the flow diagram of FIG. 6, there is described an example method of operating a supply station to enable a container to a filled to high level. Further reference is made to the illustrations of FIGS. 7A and 7B.

At block 602, the controller 110 controls a supply of build material to a container 200 installed in the supply station 102. As described above, this may be by providing a flow of, or a volume of, build material to an input 106 of a coupling mechanism 304.

At block 604, the controller 110 controls the supply station 102 to rotate a container installed therein at a speed suitable to cause build material within the container to be centrifugally forced against the outside of the internal storage reservoir 504. Such a speed may, for example, be in the order of about 120 revolutions per minute, although this may be dependent on characteristics of the build material 502, such as its flowability or density. In one example the controller 110 controls the supply station 102 to continuously rotate the container whilst it is being filled.

Figure 7A:
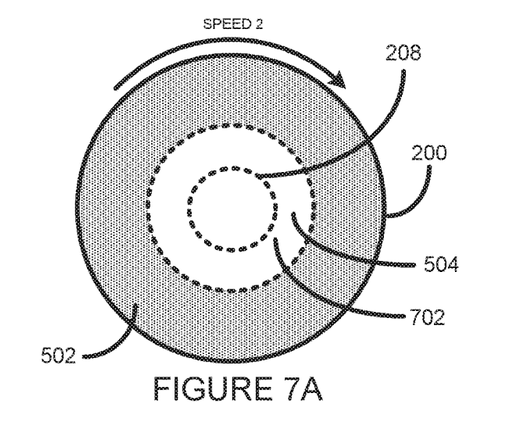
FIGS. 7A and 7B are illustrations of build material within a container according to one example.

As can be seen in FIG. 7A, rotating the container 200 at this higher speed causes the formation of a 'tunnel' 702 as the build material in the container is pushed against the outside of the reservoir. This tunnel creates a space around the container build material transport member 208, allowing further build material to move into the container reservoir 504. The centrifugal force experienced by the build material 502 compresses the build material 502 against the sides of the container reservoir 504 creating further space within the reservoir for build material to be added. In one example, the higher speed is chosen such that build material being transported by the build material transport member 208 is not centrifuged (e.g. a Froude number of less than 1), whereas build material within the container 200 is centrifuged (e.g. a Froude number greater than or equal to 1). This enables the build material transport member 208 to effectively move build material into the container 200.

Figure 7B:
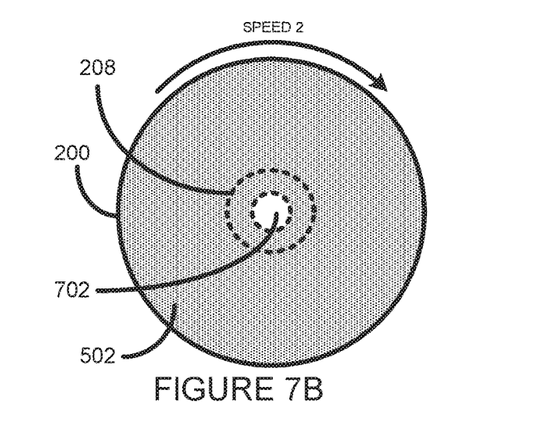

As shown in FIG. 7B, adding build material to the container 200 in this manner allows the container to be filled to a higher level than if the container 200 is rotated at a speed that does not cause build material to be centrifugally forced against the outside of the internal storage reservoir. Tests have shown that such a method enables a container to be filled to a level exceeding 90% capacity. Although it may be possible fill a container in the way described herein to a level greater than 90%, there are reasons not to fill a container to too high a fill level. For example, having a less than 100% fill level ensures some air space in the container than allows build material within the container to be aerated as the container is rotated to remove build material therefrom. This aeration helps fluidize build material within a container which may have become compacted, for example after a period of storage.

In a further example, the supply station 102 comprises a load sensor, or other suitable device, to enable the weight of a container to be determined. In one example, the load sensor enables the weight of the container to be determined as it is being rotated by the supply station 102.

Figure 8:
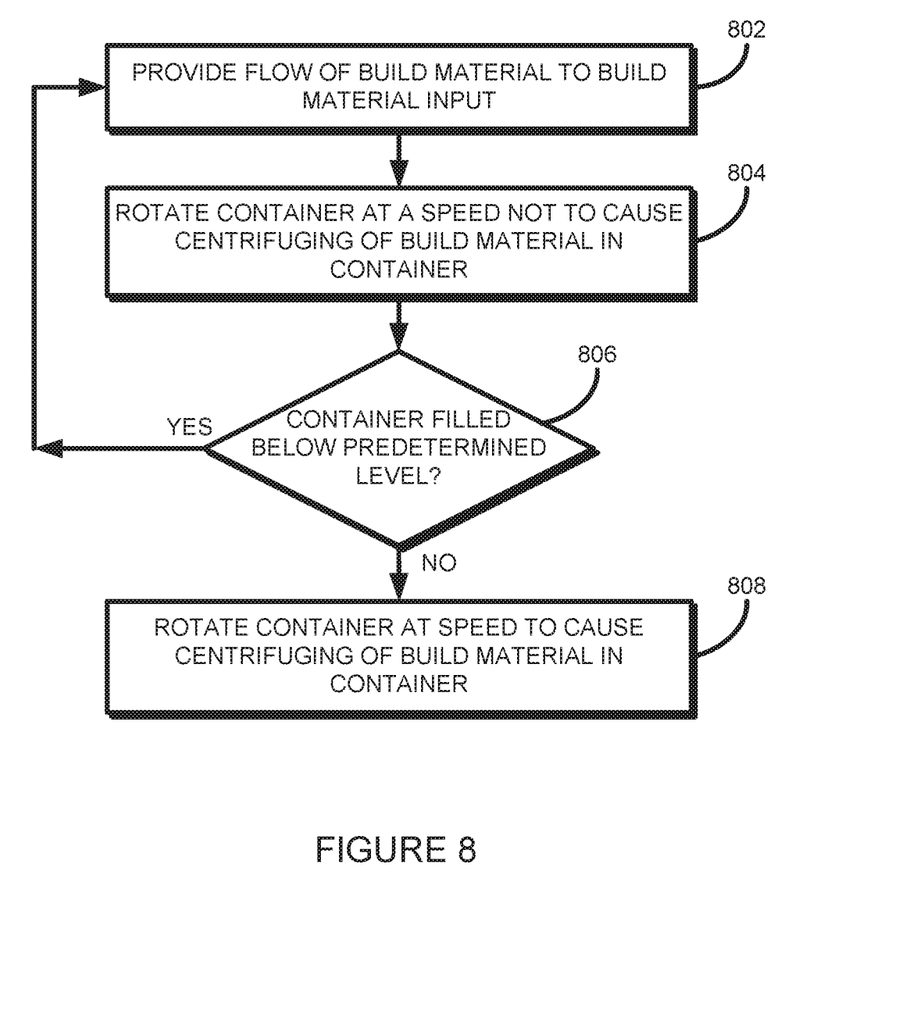
FIG. 8 is a flow diagram outlining a method of adding build material to a container according to one example.

A further method of operating the supply station, according to a further example, is shown in the flow diagram of FIG. 8.

At block 802, the controller 110 controls a flow of build material to a container installed in the supply station 102. As described above, this may be by providing a flow of build material to an input of a coupling mechanism 304.

At block 804, the controller 110 controls the supply station 102 to rotate a container installed therein at a speed that does not cause build material within the container to be centrifugally forced against the outside of the internal storage reservoir 504. Such a speed may, for example, be in the order of about 60 revolutions per minute, although this may be dependent on characteristics of the build material 502, such as its flowability.

At block 806, the controller 110 determines from the load sensor (not shown) the weight of the container and any build material therein. If the controller 110 determines from the load sensor that the fill level of the container is below a predetermined level, the controller continues to rotate the container at the same speed. In one example the predetermined fill level may be in the region of 40 to 50%.

If, however, the controller 110 determines that the fill level of the container is not below the predetermined level at block 808 the controller 110 controls the supply station 102 to rotate the container at a speed that does cause build material in the container to be forced against the outside of the internal storage reservoir 504. This enables the container 200 to be filled to a higher fill level, for example to a fill level greater than 90%.

Using a two speed filling process, as described above, may be useful to reduce noise or vibration caused by the filling process, for example by reducing the length of time at which the container 200 is rotated at a higher speed.

In a further example, the container fill level may be determined without use of a load sensor, for example by supplying build material and rotating the container for a predetermined length of time. The predetermined length of time may calculated, for example, using parameters that may include: the capacity of the container the flow rate of build material to the input; the flow rate of build material into the container through the build material transport mechanism 208; and the rotation speed of the container.

Figure 9:
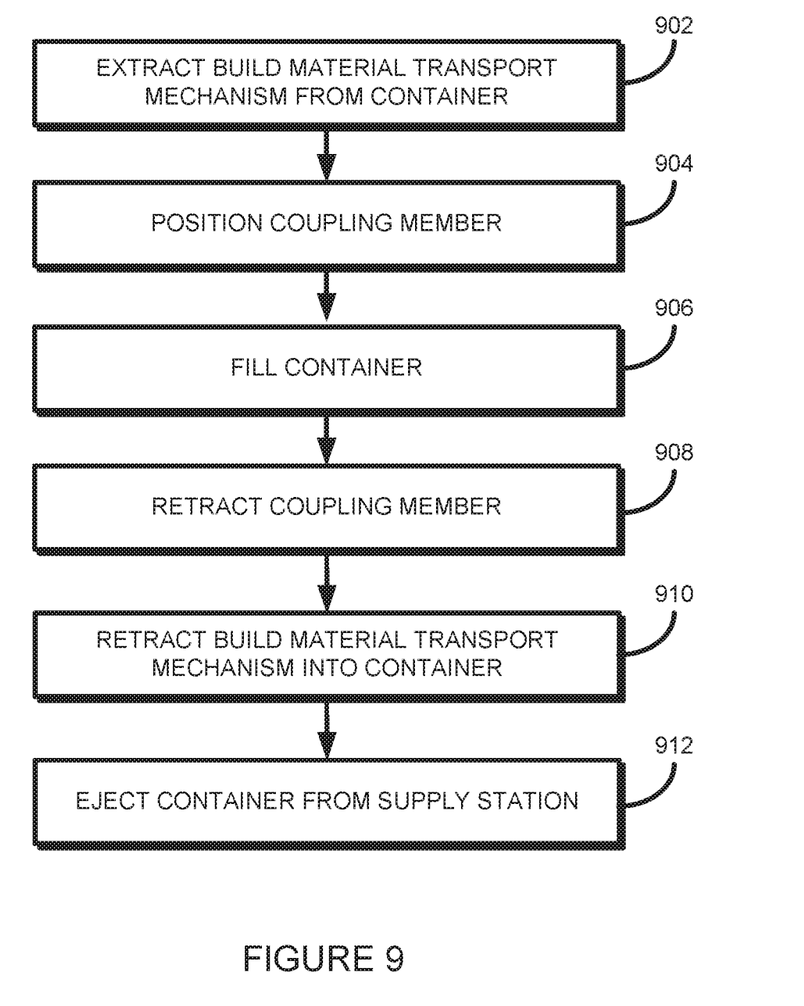
FIG. 9 is a flow diagram outlining a method of adding build material to a container according to one example.

A further method of operating the supply station 102 is described below with additional reference to the flow diagram of FIG. 9.

At block 902, upon a container 200 being installed in the supply station 102 the controller 110 controls the container build material transport mechanism extractor system 302 to move the build material transport mechanism 208 into its extended position.

At block 904, the controller 110 controls the container build material transport mechanism coupling system 304 to couple with the extended build material transport mechanism extractor mechanism 208.

At block 906, the controller 110 controls the supply station to fill the container to a predetermined fill level. This may include providing a flow, or a volume, of build material to an input, and rotating the container 200 at a suitable speed, as described above. Once the controller 110 determines that the container is appropriately filled it may control the supply station to stop rotating the container.

At block 908, the controller 110 controls the container build material transport mechanism coupling system 304 to retract from the extended build material transport mechanism extractor mechanism 208.

At block 910, the controller 110 controls the container build material transport mechanism extractor system 302 to move the build material transport mechanism 208 into its retracted position thereby sealing the container.

At block 912, the controller 110 controls the supply station 102 to eject the container 200.

Figure 10:
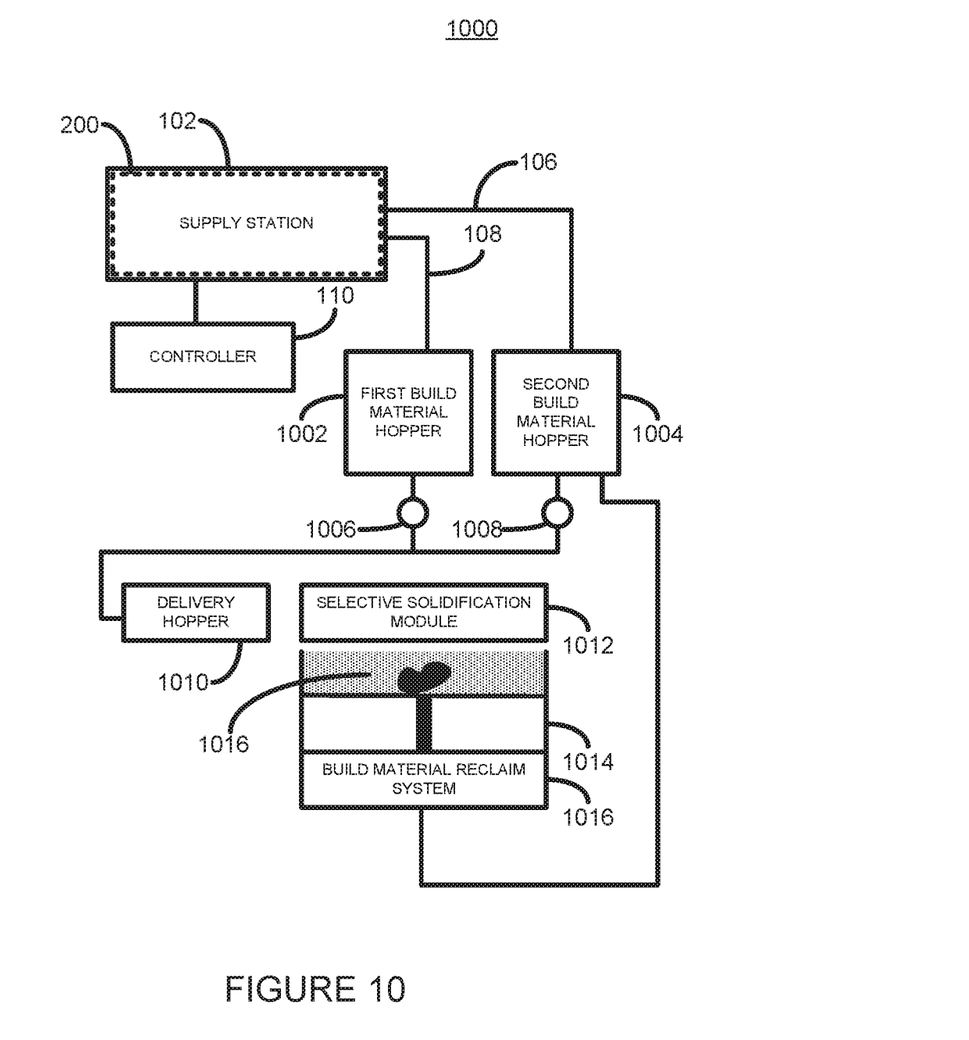
FIG. 10 is a schematic diagram of a three-dimensional (3D) printing system according to one example.

An example three-dimensional (3D) printing system 1000 comprising a supply station as described herein is illustrated in FIG. 10.

The supply station 102 is to receive a container 200 as described earlier. When a container containing fresh, or previously unused powdered build material, is initially inserted into the supply station 102 the controller 110 controls the supply station 102 to empty the contents of the container into a first fresh build material hopper 1002. A second build material hopper 1004 is also provided for storing reclaimed, or recycled, build material as will be described further below. Build material from the hoppers 1002 and 1004 may be transported to a delivery hopper 1010 using, for example, a pneumatic build material conveyancing system. The quantity and ratio of build material from each of the hoppers 1002 and 1004 may be controlled by controllable valves 1006 and 1008. The delivery hopper 1010 is used to form a pile of build material on a platform next to a build chamber, or build unit, 1014. The pile of build material may be spread over a build platform of the build chamber to form successive layers of build material 1016. Portions of each formed layer 1016 of build material may be selectively solidified by a selective solidification module 1012 to form a 3D object.

The selective solidification module 1012 may selective solidify portions of each layer of build material using any suitable solidification technology. Such technologies may include, for example: selective laser sintering (SLS) technology, fusing agent and fusing energy technology, chemical binder technology, or the like.

After completion of a 3D printing process in the build chamber 1014, any non-solidified build material may be recovered from the build chamber 1014 by a build material reclaim system 1016. Such a system may reclaim non-solidified build material, for example, by vibrating the build platform and/or using air flows.

Reclaimed build material may be transported, using the pneumatic conveyancing system, to the second build material hopper 1004.

Overtime, the second build material hopper may become full of reclaimed build material. When this occurs, an empty, or at least partially empty, build material container 200 may be filled with reclaimed build material from the second build material hopper using the method and systems described above. In this way, excess reclaimed build material may be removed from the 3D printing system 1000 in a convenient and clean manner for storage or recycling.

As used herein, the verb 'filling' should be understood to cover less than total filling.

It will be appreciated that examples described herein can be realized in the form of hardware, software or a combination of hardware and software. Accordingly, some examples provide a program comprising code for implementing a system or method as claimed herein.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method of adding build material to a rotatable 3D printing build material container having an internal build material storage reservoir, the method comprising:
   removably connecting the container to a supply station of a 3D printing system having a selective solidification module;
   providing a supply of the build material from the supply station to an input port of the container;
   while adding the build material into the container, rotating the container about a rotation axis at a first speed sufficient to cause build material within the container to be centrifugally forced away from the rotation axis within the internal storage reservoir; and,
   after adding a quantity of the build material to the container, removing the container from the supply station for storage of the quantity of build material.

2. The method of claim 1, further comprising determining, with a load sensor, a weight of the container as the container rotates to determine when the container contains a predetermined weight of build material.

3. The method of claim 2, further comprising:
   initially rotating the container at a second speed lower than the first speed, the second speed being insufficient to cause the build material within the container to be centrifugally forced toward sides of the internal storage reservoir, whilst the determined weight of the container is below a first threshold weight, and thereafter rotating the container at the first speed.

4. The method of claim 3, further comprising:
   in response to determining that the weight of the container is at or above the first threshold weight, rotating the container at the first speed; and
   while rotating the container at the first speed, adding more build material to the container, wherein the amount of build material that can be input to the container when it is rotated at the first speed is greater than the amount of build material that can be input when it is rotated at the second speed.

5. The method of claim 1, wherein rotating the container in a first direction causes an internal feature of the container, comprising a screw thread or angled blades, to move the build material in the container from the input port end of the container towards a closed end of the container.

6. The method of claim 1, wherein the input port comprises a moveable build material transport mechanism, and wherein the method further comprises moving the build material transport mechanism from a retracted position in which the build material transport mechanism is inside the container and seals the input port end of the container to an extended position in which the build material transport mechanism extends outside the container and build material fed to the build material transport mechanism is moved, upon rotation of the container, into the build material storage reservoir.

7. The method of claim 1, wherein providing a supply of the build material comprises providing a supply of reclaimed build material from a three-dimensional printer or an element thereof.

8. The method of claim 1, wherein each complete rotation of the build material container causes an amount of the build material to be added to the build material storage reservoir.

9. The method of claim 1, further comprising:
initially rotating the container at a second speed lower than the first speed;
adding a first portion of the quantity of build material to the container while the container is rotating at the second speed; and, then,
adding a second portion of the quantity of build material to the container while the container is rotating at the first speed.

10. The method of claim 1, further comprising sealing the input port of the container after the quantity of build material has been added to the container.

11. The method of claim 1, further comprising transporting the build material inside the container with an internal transport system formed with features arranged around an interior wall of the reservoir to move the build material with rotation of the container.

12. A method of filling a build material storage container, the method comprising:
adding build material to the container from a supply station of a 3D printing system having a selective solidification module;
while adding the build material into the container, rotating the container about a rotation axis at a first speed sufficient to cause build material within the container to be centrifugally forced away from the rotation axis within an internal storage reservoir of the storage container; and,
after adding a desired quantity of the build material to the container, sealing the container to store the quantity of build material until needed for use by an additive manufacturing system.

13. The method of claim 12, wherein the desired quantity of build material fills 90% of a capacity of the container.

* * * * *